(12) United States Patent
Rettenmaier

(10) Patent No.: US 8,518,132 B2
(45) Date of Patent: Aug. 27, 2013

(54) METHODS OF ALGAE HARVESTING UTILIZING A FILTERING SUBSTANCE AND USES THEREFOR

(76) Inventor: Albert C. Rettenmaier, Prairie Village, KS (US)

( * ) Notice: Subject to any disclaimer, the term of this patent is extended or adjusted under 35 U.S.C. 154(b) by 275 days.

(21) Appl. No.: 12/966,449

(22) Filed: Dec. 13, 2010

(65) Prior Publication Data

US 2011/0143012 A1    Jun. 16, 2011

Related U.S. Application Data

(60) Provisional application No. 61/285,875, filed on Dec. 11, 2009.

(51) Int. Cl.
*C10L 5/00*    (2006.01)

(52) U.S. Cl.
USPC .............................................. 44/605; 44/628

(58) Field of Classification Search
USPC .................................................. 44/605, 628
See application file for complete search history.

(56) References Cited

U.S. PATENT DOCUMENTS

| | | | |
|---|---|---|---|
| 4,324,067 A | 4/1982 | Kessler | |
| 4,554,390 A | 11/1985 | Curtain et al. | |
| 4,958,460 A | 9/1990 | Nielson et al. | |
| 5,951,875 A | 9/1999 | Kanel et al. | |
| 6,000,551 A | 12/1999 | Kanel et al. | |
| 7,191,736 B2* | 3/2007 | Goldman | 123/1 A |
| 2007/0048848 A1 | 3/2007 | Sears | |
| 2009/0298159 A1 | 12/2009 | Wu et al. | |
| 2010/0269514 A1* | 10/2010 | Fullton, III | 60/772 |

FOREIGN PATENT DOCUMENTS

| | | |
|---|---|---|
| KR | 10-2008-0091257 | 10/2008 |
| WO | 2007/089677 | 8/2007 |

OTHER PUBLICATIONS

Search Report and Written Opinion dated Aug. 31, 2011 in corresponding PCT/US2010/060061 filed on Dec. 13, 2010.
Lee et al., "Use of Red Algae Fiber as Reinforcement of Biocomposite," 2008, Journal of Korea TAPPI, vol. 40, No. 1, pp. 62-67.

* cited by examiner

*Primary Examiner* — Cephia D Toomer
(74) *Attorney, Agent, or Firm* — Hovey Williams LLP

(57) ABSTRACT

Methods of harvesting algae, and using algae as a biofuel, livestock feed, or food supplement are provided. The methods comprise contacting liquid algae suspensions with a filtration media. Depending upon the filtration media, the resulting algae and filtration media admixture is then utilized as a biofuel, livestock feed, food supplements, or for the extraction of algae oil. Admixtures comprising a combustible filtration media, such as coal, are particularly preferred. The methods are suitable for use with any algae species. Compositions for use as a biofuel, livestock feed, or food supplement are also provided. These compositions comprise an admixture of algae and a filtration media.

23 Claims, 7 Drawing Sheets
(3 of 7 Drawing Sheet(s) Filed in Color)

METHODS OF ALGAE HARVESTING UTILIZING A FILTERING SUBSTANCE AND USES THEREFOR

CROSS-REFERENCE TO RELATED APPLICATIONS

The present application claims the priority benefit of U.S. Provisional Application Ser. No. 61/285,875, filed Dec. 11, 2009, incorporated by reference in its entirety herein.

BACKGROUND OF THE INVENTION

1. Field of the Invention

The present invention relates to methods of harvesting algae for the production of biofuel, bioenergy, supplemented animal feed, food supplements, and algae oil.

2. Description of Related Art

Algae biomass shows great promise as a renewable fossil fuel replacement and as a food supplement. There is need in the art for a low cost, effective method for harvesting algae biomass and making it available as fuel or food. However, harvesting of algae from water or other liquids is currently a difficult process due to the physical properties and nature of algae. Many existing methods of harvesting algae focus on isolation of the algae itself. Thus, when mechanical or physical methods of harvesting algae from water are used, these processes include the additional difficult step of further separating the algae from the filtering substances utilized in the method. Such separation often involves the use of undesirable solvents or detergents. Other methods of harvesting algae utilize chemical or mechanical means of flocculation, centrifugation, or sedimentation to facilitate skimming of algae from the surface of the algae water or collection of algae sediment. Some methods also produce an algae paste, which then must be dried and re-divided for further processing. Many existing methods also require specially cultured algae, which requires extra nutrients and manipulation of the algae source, adding further difficulties to the process. Thus, there remains a need in the art for methods of harvesting algae that do not involve the drawbacks of existing algae harvesting processes.

SUMMARY OF THE INVENTION

The present invention is broadly concerned with an algae filtering system, which yields an algae/filtration media admixture for further processing or combustion. The admixture comprises a physical mixture of the filtration media and algae dispersed therein and thereon. In general, the system uses a granular, particulate or fibrous filtration media to recover the algae from liquid. The algae can then be further processed, with or without the filtration media. Further processing can include combustion of the algae/filtration media admixture, partial combustion for production of synthesis gas, recovery of algae or algae oil from the algae/filtration media admixture, or the algae/filtration media admixture can be used for livestock feed or as a food supplement.

More specifically, in one aspect, the invention provides a method of using algae as a biofuel. The method comprises providing an admixture comprising algae and a filtration media and burning the admixture to generate heat. In some embodiments, this heat can be converted into electricity. The algae and filtration media admixture is prepared by providing an algae suspension comprising algae dispersed in a liquid medium, and contacting the algae suspension with a filtration media, wherein the algae is collected by or on the filtration media to yield the algae and filtration media admixture. In some embodiments, a filtration bed is utilized for contacting the algae with the filtration media.

In a further aspect, the invention provides a method of harvesting algae for livestock feed or food supplements. The method comprises providing an algae suspension comprising algae dispersed in a liquid medium, contacting the algae suspension with a filtration media, wherein the algae is collected by or on the filtration media to yield an algae and filtration media admixture. Then, without separating the algae from said filtration media, using the admixture as livestock feed or a food supplement. The filtration media is preferably selected from the group consisting of grains, plant materials, biomass, fermentation byproducts, chaff, flour, and mixtures thereof.

The invention also provides a composition for use as a biofuel, livestock feed, or food supplement comprising an admixture of algae and a filtration media. Suitable filtration media are preferably selected from the group consisting of coal, petroleum coke, charcoal, torrified biomass, wood, grasses, straw, leaves, hulls, shells, bagasse, chaff, corn stover, distillers dried grains, sawdust, ground refuse, manure, paper, paperboard, pulp, seed cleanings, hay, ground corn, wheat, wheat middlings, soybean hulls, oat hulls, milo, rye, oats, soybeans, alfalfa, canola meal, safflower, safflower meal, corn gluten feed, hemp, jute, cotton, plastics, rocks, sand, gravel, minerals, ceramic, dirt, clay, metal, metal mesh or screens, sintered metal, pebbles, fly ash, aluminosilicates, glass, porous glasses, lime, limestone, ash, activated alumina, silica, zeolites, grains, chaff, flour, tires, rubber, fabric, gauze, fiberglass, aggregate, batting, soot, carbon, shale, activated carbon, filter membranes, magnets, diatomaceous earth, Kieselguhr, and combinations thereof. The admixture is preferably dried, and more preferably has a moisture content of less than about 5% by weight, based upon the total weight of the admixture taken as 100% by weight.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
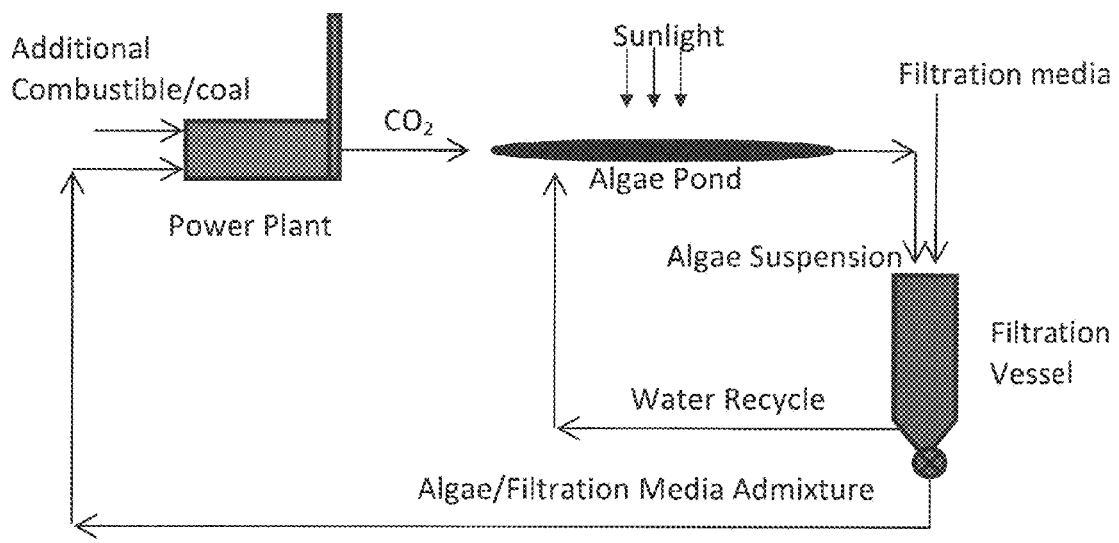
FIG. 1 is a diagram of one process involving combustion of the algae and filtration media admixture according to the invention.

In more detail, the invention provides methods of harvesting algae using filtration media. Algal suspensions from a source of algae (e.g., pond, water stream) are passed through the filtration media, which mechanically or physically removes the algae from the liquid suspension. That is, although adsorption (e.g., chemical interaction) may occur in some embodiments, the methods of the invention are concerned primarily with physical separation and may not involve adsorption or other chemical interaction between the filtration media and algae. The algae collects on or is collected by the filtration media, and in some cases becomes embedded therein. The filtrate can then be recycled back through the filtration media until the desired level of removal is achieved, or the filtrate can be returned to the source of algae. The filtrate can also be used for irrigation or otherwise discharged from the system. Unlike existing algae harvesting methods, algae collected according to the present invention does not have to be separated from the filtration media for use. Rather, the algae and filtration media admixture is itself a useable product. In one aspect, the algae and filtration media admixture can be used as a biofuel and burned or combusted to produce heat and/or energy. A diagram of this process is depicted in FIG. 1. In another aspect, the algae and filtration media admixture can be used for livestock feed or as a food supplement. It will also be appreciated that algae and/or algal oil can also be isolated from the algae and filtration media admixture using known methods.

Suitable sources of algae include any environment (e.g., liquid medium) suitable for algae growth. Specific examples include naturally-occurring algae-laden water streams, natural or man-made ponds and lakes (including ponds designed specifically to grow algae), polluted water streams, cattle feed lot ponds, concentrated animal feed operation (CAFO) ponds, algae culture vessels, algae open ponds, algae closed ponds, algae raceway ponds, settling basins, water troughs, water holding tanks, wastewater, seawater, photobioreactors, anaerobic digester effluent, freshwater, salt water, brackish water, brine, and combinations thereof. The invention is suitable for filtering any aquatic algae species, blends of species, natural mixtures of species, and/or genetically engineered species. Some preferred types of algae for use in the invention are selected from the group consisting of Diatoms, Chlorophyta (green algae), Euglenophyta, Dinoflagellata, Chrysophyta, Phaeophyta (brown algae), Rhodophyta (red algae), and Cyanobacteria (blue-green algae). Particularly preferred algae genera within the above groups include *Botryococcus, Ankistrodesmus, Chlorella, Coelastrum, Scenedesmus, Klebsormidium, Dictyochloropsis, Kirchneriella, Phormidium, Lyngbya, Oocystis, Oscillatoria, Cosmarium, Leptolyngbya, Monoraphidium, Phormidium, Ulothrix, Anabaena, Uronema, Hydrodictyon, Chlorococum, Cladophora, Lemna,* and combinations thereof, with *Botryococcus braunii* being a particularly preferred species. The invention is particularly suited for filtration of microalgae (1-10 μm). The invention is suitable for filtration of brines and brackish growth media, as well as freshwater algae suspensions (including municipal/ treated water sources). However, depending on the type of algae, the salinity of the algae suspension will preferably range from about 0M to about 3M, more preferably from about 0M to about 0.7M, and even more preferably from about 0M to about 0.1M. One advantage of the present invention is that the methods can be used with native algae sources, and do not require special cultivation procedures or manipulation of the algae source (such as increasing salinity, or manipulating lipid content by supplying extra or special nutrients, or modifying growth conditions, etc.). This decreases the overall energy input of the system and provides a more natural bioenergy source compared to existing algae harvesting methods which often rely on specially cultured algae sources.

Suitable filtration media will be any organic or inorganic granular, particulate, porous, or fibrous filtering substance. It will be appreciated that the filtration media can be ground, crushed, or pulverized to achieve the desired particle or fiber size prior to filtration. In one embodiment, the filtration medium is preferably a combustible material. Examples of suitable combustible filtration media include carbonaceous solids, fibrous plant materials, torrified biomass, fibrous animal waste, fibrous industrial or recyclable waste products, paper products, and combinations thereof. Particularly preferred filtration media in this embodiment are selected from the group consisting of coal (e.g., fines, raw, crushed, pulverized, screened, wet or dry), petroleum coke (e.g., fines, raw, crushed, pulverized, screened, wet or dry), charcoal, torrified and untorrified biomass (e.g., wood, grasses, straw, leaves, hulls, shells, bagasse, chaff, corn stover, distillers dried grains, sawdust, ground refuse, manure, paper, paperboard, pulp, seed cleanings, hay, ground corn, wheat, wheat middlings, soybean hulls, oat hulls, milo, rye, oats, soybeans, alfalfa, canola meal, safflower, safflower meal, corn gluten feed), hemp, jute, cotton, plastics (e.g., nylon, polyester), and mixtures thereof. The methods can be used to enhance the combustion value of the filtration media, and can include subsequent fermentation processes prior to combustion. In another embodiment, the filtration medium is a non-combustible, inert carrier, such as rocks, sand, gravel, minerals, ceramic, dirt, clay, metal, metal mesh or screens, sintered metal, pebbles, fly ash, aluminosilicates, glass, porous glasses, lime, limestone, ash, activated alumina, silica, zeolites, and mixtures thereof. In this embodiment, the carrier component of the admixture is not actually combusted or burned, but is instead collected or removed from the combustion chamber, once the algae is combusted, and recycled for use in subsequent filtration processes. Heat can also be recovered from the carrier via heat exchange before reusing the carrier for filtration. In a further embodiment, the methods can be used to enhance the nutritional value of the filtration media for animal feed or food supplements. Suitable filtration media in this embodiment includes the grains, plant materials, and biomass, listed above, as well as fermentation byproducts (e.g., distillers dried grain), chaff, flour, and mixtures thereof. Other materials that could be used as filtration media include tires, rubber, fabric, gauze, fiberglass, aggregate, batting, soot, carbon, shale, activated carbon, filter membranes, magnets, diatomaceous earth, and Kieselguhr.

In one embodiment, the filtration media is paper or paper pulp. In this embodiment, the resulting wet admixture can be used as fuel, or dried and used as fuel. In addition, the admixture can be pelletized or briquetted for use as fuel, such as in a wood burning stove. Alternatively, the admixture can be treated for recovery of algae oil, or further processed and recycled for re-use as paper.

In a preferred embodiment, the filtration media is coal, with the resulting algae/coal admixture being fed into a coal-fired power plant for combustion (e.g., into a combustion chamber for burning). The admixture is burned to generate heat, which is converted into electricity in the power plant. Preferably, the admixture is pulverized into a fine powder of talcum-consistency prior to combustion, as in conventional pulverized coal power plants. Advantageously, dried algae has roughly the same energy output as coal. Thus, in the algae/coal admixture, the algae displaces some of the coal used in the process, decreasing the total amount of coal necessary for combustion, with roughly the same total energy output. For example, a 10-lb. sample of the dried algae/coal admixture (containing 1 lb. of algae and 9 lbs. of coal) could be combusted to yield the same energy output as 10 lbs. of dried coal. Accordingly, this process would be eligible for a carbon credit, and the energy produced by the algae component of the admixture would be renewable energy and qualify towards Renewable Energy Portfolio Standards. The carbon dioxide generated by the power plant could also be used as a nutrient for the algae source, as described below. Preferred types of coal for use in the invention are selected from the group consisting of anthracite, lignite, sub-bituminous (e.g., Powder River Basin), bituminous (e.g., Appalachia; Ill.), steam, cannel coal, and combinations thereof. Coal is generally available in sizes of from about 2 inches and smaller down to the fines (which are usually less than 50 microns). Preferably, the raw coal received from the mine, conveyor belt or rail car performs well in capturing algae "as is," however, if this is not the case, then the coal is preferably crushed, pulverized, and/or screened prior to use. When used, pulverized coal preferably has an average particle size of from about 3 microns to about 1 mm, more preferably from about 27 microns to about 425 microns, and even more preferably from about 50 microns to about 200 microns. Crushed coal preferably has an average particle size of from about 0.3 mm to about 25 mm, more preferably from about 0.4 mm to about 5 mm, and even more preferably from about 0.5 mm to about 1 mm. In some embodiments, the combination of crushed and pulverized coal is preferred. The term "particle size," as used herein, refers to the maximum surface-to-surface dimension of the coal particles or pieces. The "average" particle size refers to the size which typifies a given sample of the coal, although it will be appreciated that some particles or pieces in the sample will be slightly smaller or larger than this value. It will also be appreciated that depending upon the size of the filtration vessel, the particle size of some of the coal pieces can be as large as 60 mm or larger in some embodiments, such as a coal rail car.

Regardless of the embodiment, the filtration method comprises contacting the algae suspension with the filtration media, which generally involves collecting and pumping or otherwise transporting the algae suspension from the source of algae and contacting it with the filtration media. The concentration of the algae in the natural suspension will preferably range from about 0.01% by weight to about 1% by weight, more preferably from about 0.06% by weight to about 0.5% by weight, and even more preferably from about 0.06% by weight to about 0.2% by weight, based upon the total weight of the suspension taken as 100% by weight. If necessary or desired, the algae suspension can be preconcentrated using flocculation or gravity sedimentation (e.g., centrifugation or passive separation using settling ponds and vessels) or other methods. Other methods for preconcentration include the use of dewatering agents, such as flocculants, coagulants, water soluble polymers, organopolysiloxanes, sodium hexametaphosphates, alkylphenyolethyloxalate, electric charge manipulation, and peptiding agents. The concentration of the algae in the preconcentrated suspension will preferably range from about 0.2% by weight to about 10% by weight, more preferably from about 0.5% by weight to about 7% by weight, and even more preferably from about 1% by weight to about 5% by weight, based upon the total weight of the suspension taken as 100% by weight. The algae concentration in the resulting filtrate will be at least about 70% less than in the initial algae concentration of the suspension, preferably at least about 90% less than in the initial algae suspension, and more preferably at least about 98% less than the initial algae concentration of the suspension, and even more preferably about 100% less than the initial algae concentration of the suspension.

Figure 2:
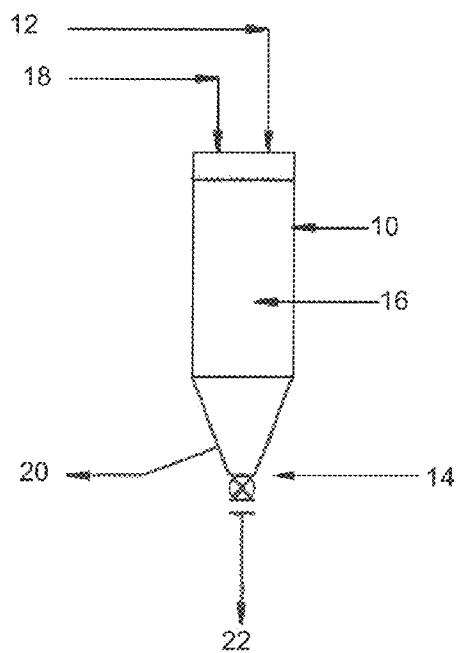
FIG. 2 is a drawing (not to scale) of a preferred filtration vessel in accordance with one embodiment of the invention.

In one aspect, the algae suspension is contacted with the filtration media using a filtration bed. This aspect relies on a bed of filtration media through which the algae suspension flows, usually downward, under gravity or active pressure. The alga is collected on the filtration media and in the interstitial spaces or voids between the particles or granules of media throughout the volume of the media. More specifically, a filtration vessel having an inlet and an outlet is partially or completely filled with filtration media to create the filtration bed. Preferably, at least about 60% of the interior volume of the vessel is filled with the filtration media. In some embodiments, the filtration bed comprises layers of different filtration media or layers of the same filtration media of different particle sizes. In general use, the algae suspension is fed into the inlet, passed through the filtration media in the bed, and the resulting filtrate exits the vessel outlet. The filtrate can be recycled back through the vessel multiple times, sent back to the algae source, collected for later use, or simply discarded. A preferred filtration vessel is depicted in FIG. 2. The vessel 10 is a cylindrical column oriented vertically. It will also be appreciated that although a cylindrical column is depicted, any suitable cross-sectional shape could be utilized (e.g., oval, square, geometric). The inlet 12 is at the top of the vessel 10, and the outlet 14 is at the bottom of the vessel 10. The vessel 10 can be configured with the appropriate valves, lockhoppers, nozzles, distributors or removable heads for input and removal of the algae suspension and filtration media. The vessel 10 is filled with the filtration media to form the filtration bed 16. The algae suspension 18 is then added to the vessel. As the suspension 18 flows through the bed 16, the algae is collected by the filtration media and the filtrate 20 exits the outlet. The resulting admixture 22 is removed from the vessel for subsequent processing. It will be appreciated that the size and dimensions of the vessel will vary greatly, depending upon a given application of the technology (e.g., large-scale commercial/industrial vs. small-scale operations). The length of the vessel will generally range from about 1 ft. to about 100 ft., more preferably from about 10 ft. to about 100 ft., and even more preferably, from about 30 ft. to about 70 ft. The diameter (or width, as the case may be) of the vessel will preferably range from about 10% of the length to about 50% of the length of the vessel, and more preferably from about 15% of the length to about 25% of the length of the vessel. Regardless of the shape, the interior volume of the vessel preferably ranges from about 8 $ft^3$ to about 8000 $ft^3$, and more preferably from about 100 $ft^3$ to about 6000 $ft^3$. The ratio of the bed depth to diameter (or width) is preferably from about 10:1 to about 2:1, and more preferably from about 6:1 to about 4:1.

Although passive gravity-based filtration can be used, the filtration system can also be employed in a closed system in which the algae suspension is actively pumped into the vessel until the volume of entrapped algae on the filtration media meets the desired loading. The flow rate of the algae suspension is preferably from about 0.5 gallons per minute (gpm) to about 100,000 gpm, more preferably from about 100 gpm to about 75,000 gpm, and even more preferably from about 20,000 gpm to about 30,000 gpm. The pressure of the system preferably ranges from about 0 psig to about 200 psig, more preferably from about 0 psig to about 50 psig, and even more preferably from about 1 psig to about 10 psig. Filtration is preferably carried out under ambient temperature (e.g., approx. 0-40° C.). Control of the algae loading can be done by monitoring the pressure drop across the bed or the decrease in the flow rate. In general, filtration proceeds until a pressure drop of from about 2 psi to about 200 psi is observed, preferably from about 10 psi to about 50 psi, and more preferably from about 2 psi to about 10 psi. Likewise, filtration can also proceed until the flow rate decreases by about 50%, more preferably by about 75%, and even more preferably by about 90%. However, it will be appreciated that these parameters will vary depending upon the filtration media, size of the filtration bed, as well as the cell size of the algae being filtered and concentration of the algae suspension feed. In the case of gravity flow filtration, the harvesting proceeds until liquid accumulates above the bed to a certain height. This height is preferably less than about 20 ft., more preferably less than about 10 ft., and more preferably less than about 1 ft.

The resulting algae and filtration admixture can then be removed from the vessel for further processing. For example, the admixture can be dried using sunlight and wind, vacuum, forced-air drying, steam heating, waste heat utilization, contact with a drier substance, or other suitable methods. The dried admixture will preferably have a moisture content of less than about 15% by weight, more preferably less than about 5% by weight, and even more preferably from about 0% to about 0.5% by weight, based upon the total weight of the admixture taken as 100% by weight. The dried admixture can then be combusted or fed to livestock to supplement existing feed or as the feed itself. The admixture can also be further crushed or pulverized prior to use. Vacuum pressure may also be used to rupture the algae cells for enhanced combustion or collection of oils and cellular by-products for food supplement purposes. Oil can be separated from the other liquid components by conventional means, including filtration, titration, or phase separation. Other methods of drying the admixture, when desired, include the use of dewatering agents, such as flocculants, coagulants, water soluble polymers, organopolysiloxanes, sodium hexametaphosphates, alkylphenyolethyloxalate, and peptiding agents. Alternatively, the wet admixture can be used directly for combustion or as a feed supplement. The admixture can also be packaged or stored for later use. The vessel can then be refilled with filtration media for re-use. Multiple vessels can also be used in parallel.

Figure 3:
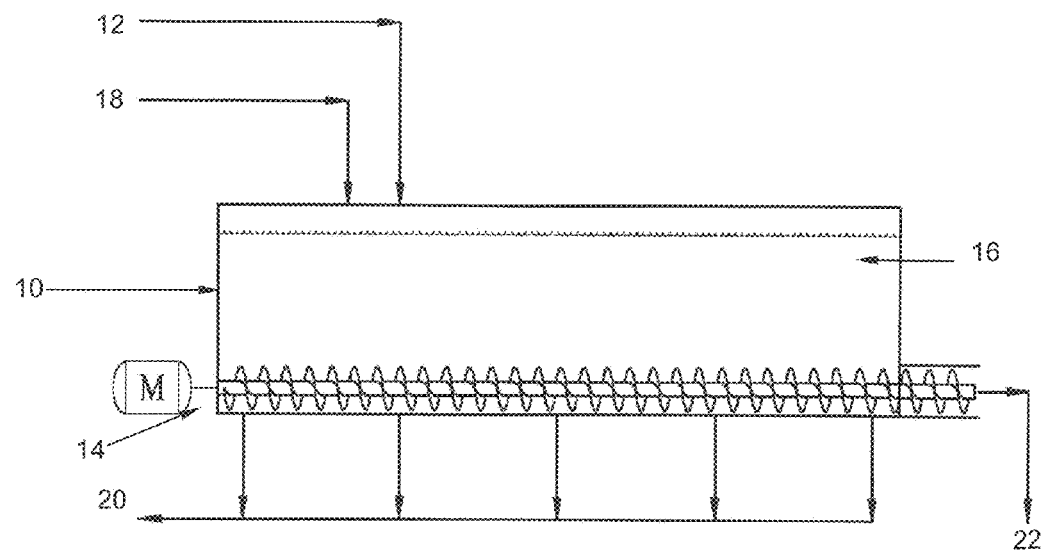
FIG. 3 is a drawing (not to scale) of a filtration vessel in accordance with another embodiment of the invention.
Figure 4:
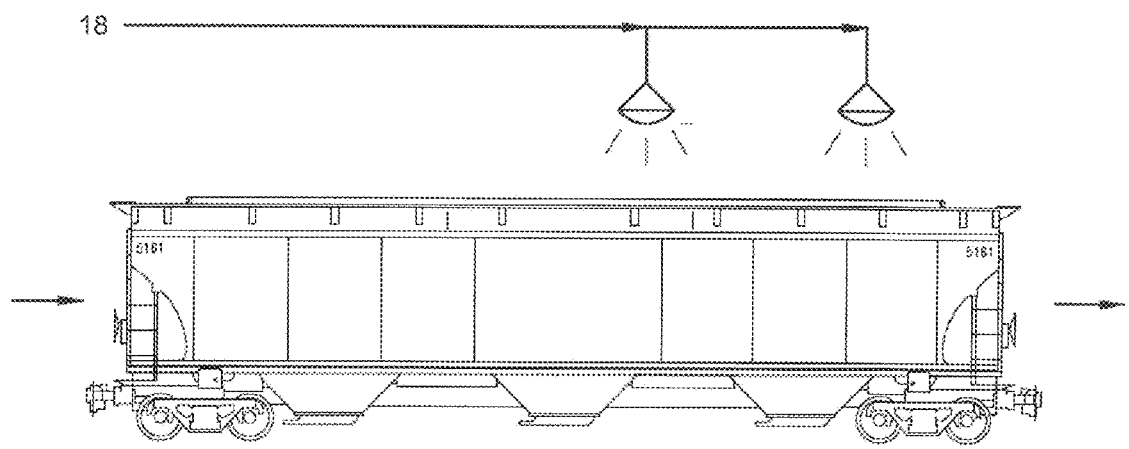
FIG. 4 is a drawing (not to scale) of a rail car filtration vessel in accordance with another embodiment of the invention.

In another aspect, the vessel can comprise a holding tank, rail car, pile, slab, or trough open to the atmosphere. An example of this embodiment is depicted in FIG. 3, with like numbering used for like parts from FIG. 2. The vessel 10 can be filled with the filtration media to form the filtration bed 16, followed by applying the algae suspension 18 to the top of the bed 16. The algae suspension 18 can be applied by spraying, pouring, doping, dumping, distributing, pumping, or dripping the algae suspension over the filtration media bed 16. The algae suspension 18 passes downward through the filtration media bed 16 via gravity. The vessel 10 can include a dumping mechanism or a screw or other device for conveying the algae and filtration media admixture 22 out of the vessel 10. The vessel 10 can also include an outlet 14 to allow the liquid (filtrate) 20 from the algae suspension 18 to exit the vessel 10. This embodiment is particularly suited for use with rail cars transporting coal, as show in FIG. 4. For example, the rail car can pass underneath a spigot or spray that can apply the algae suspension 18 to the coal in the car. As the algae suspension is filtered through the coal bed, the algae become entrapped in and between the coal. The algae/coal admixture in the rail car continues to the power plant as with conventional coal transportation, where it is removed from the rail car, optionally dried and/or pulverized, and fed into a combustion chamber. The algae suspension could be applied early in the transportation process (e.g., remote from the power plant) or immediately prior to combustion, as in the case of an algae source (e.g., pond) on or near the power plant property.

Another advantage of the inventive method is that the algae suspension, once applied to the coal bed, can form a fibrous mat that can help bind coal fines and particles in the coal bed, and/or can bind and agglomerate the coal particles, thereby reducing the amount of coal lost to wind erosion during transportation of the coal in the rail car. Wind erosion coal losses from rail cars is an increasingly significant environmental issue, as well as a safety issue. The fouling of ballast by coal losses from rail cars has weakened train tracks and even led to derailments.

Alternatively, the algae suspension can simply be sprayed or poured over coal piles before loading onto the rail cars, or after removal from the rail cars but before combustion. Another advantage of the inventive method is that algae suspensions can be applied for fire suppression in low rank and other coals where spontaneous combustion can occur. The algae suspension can be used to treat hot spots in coal piles, coal mines and other locations. Further advantages include the suppression of oxidation of coals by coating the coal with a film of algae.

In a further aspect, the filtration media bed can be carried on a dewatering screen, conveyor belt, or other similar horizontal belt filter, with the algae suspension being applied to the filtration media as it is carried on the belt. The resulting algae and filtration media admixture can then be conveyed directly to a combustion chamber, if desired, or to a holding vessel for further processing, as described herein. The admixture could also be packaged for distribution, such as in the case of animal feed and food supplements. The admixture can be dried on the same conveyor or transferred to another conveyor for drying.

Figure 5:
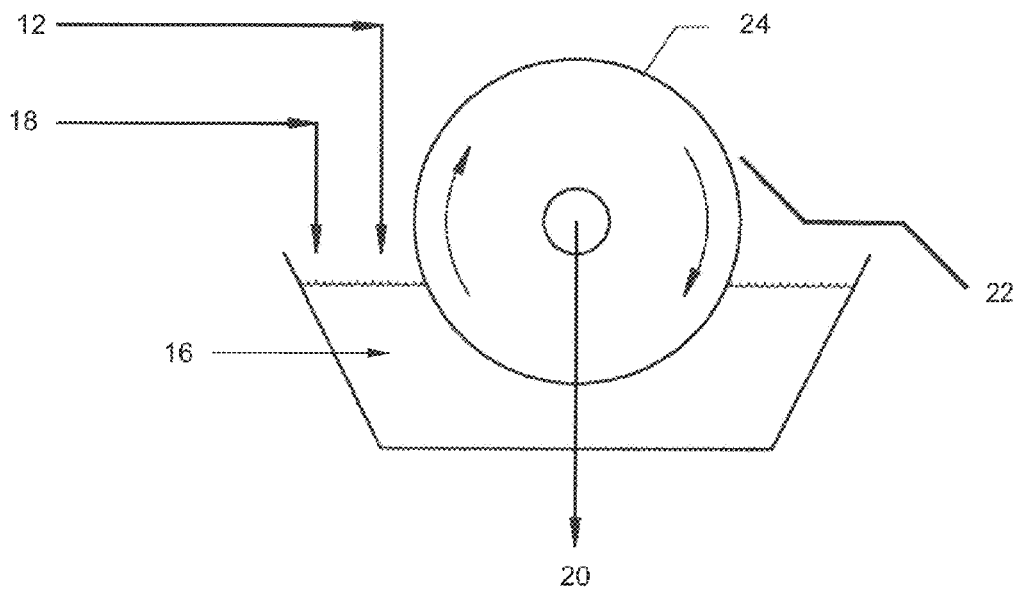
FIG. 5 is a drawing (not to scale) of a drum filtration vessel in accordance with another embodiment of the invention.

In another aspect, a rotary drum filter may be used as the filtration vessel 10, as shown in FIG. 5, with like numbering being used for like parts as in FIG. 2. In this aspect, the filtration bed 16 and algae suspension 18 are mixed together in a trough 10 below the drum 24 forming a slurry. Half of the drum 24 is submerged in the slurry, with the other half above it. A filter cloth winds around the drum and, as the drum rotates, the resulting algae and filtration media admixture 22 is sucked into the cloth and the filtrate 20 is discarded. As the drum rotates out of the slurry, the admixtures 22 is dried by the continuous vacuum being drawn through the admixture in the exposed section of the drum. At the end of each rotation cycle (approximately a three o'clock position), the admixture 22 is discharged and the process repeats itself. This filtration vessel 10 may incorporate a drum cloth that is caulked onto the drum 24 itself, or it can utilize an endless belt which tracks off and discharges away from the drum 24. In lieu of being used as the filtration vessel, the drum filter can also be used subsequent to one of the other filtration systems described herein to dry the admixture.

Regardless of the embodiment, the admixture will preferably comprise from about 0.5% by weight algae to about 90% by weight algae, more preferably, from about 5% by weight to about 25% by weight algae, and even more preferably from about 8% by weight to about 12% by weight algae. The % by weight algae, as used herein, is based upon the dried algae weight as a % of the total weight of the dried algae and filtration media admixture taken as 100% by weight. It will be appreciated that depending upon the source of the algae, other organic material from the algae suspension may also become entrapped in the filtration media. Such material is also often suitable for combustion or further processing as described herein.

Figure 6:
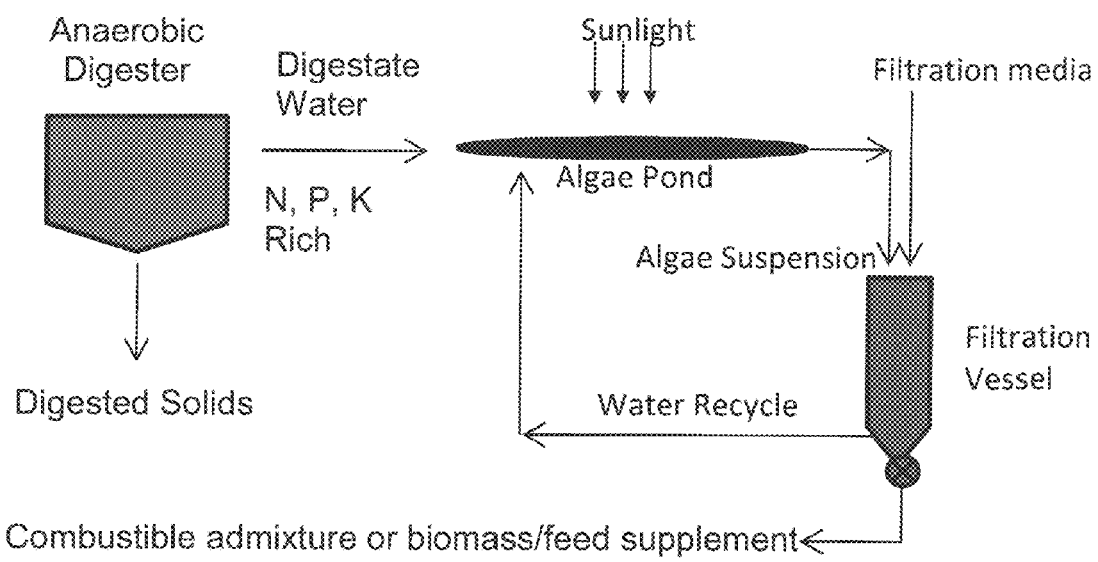
FIG. 6 is a diagram of a process according to a further embodiment of the invention involving an anaerobic digester.

The algae growing and harvesting process can also be combined with an anaerobic digester. A example of this system is depicted in FIG. 6. The digestate water (effluent) from the anaerobic digester is sent to the algae source (e.g., pond, holding tank, etc.). This water is rich in nutrients, which the algae convert into useable algae fuel. Both heterotrophic and autotrophic algae can be grown using this system. The algae suspension from this algae source will also often contain fibrous or particulate material (waste) from the digester effluent, which is also trapped by the filtration media in the inventive methods and used as biomass for combustion. For example, when coal is the filtration media, the algae/waste/coal admixtures can be sent to the power plant to produce power or heat in a generating plant, as described herein. Another use involving anaerobic digesters is to use biomass as the filtration media, and collect the algae and fibrous or particulate material in the digester effluent. The resulting algae/waste/biomass admixture can be further processed into compost or fertilizer or combusted for heat recovery or power generation.

Figure 7:
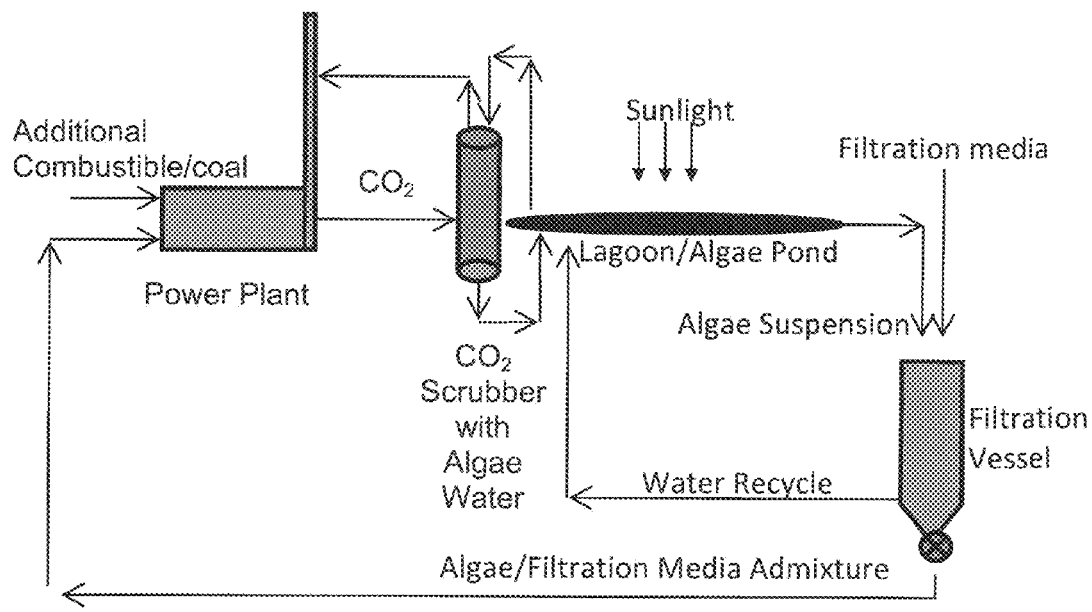
FIG. 7 is a diagram of a process according to a further embodiment of the invention involving $CO_2$ sequestration after combustion of the algae and filtration media admixture.

In processes involving combustion of the algae and filtration media admixture, the algae suspension or source can be used as a carbon dioxide scrubber in some configurations. That is, combustion of the admixture yields a gas stream comprising carbon dioxide. The gas stream can be fed through the algae suspension or source (such as a pond or other water feature near the power plant) which scrubs (i.e., removes) at least a portion of the carbon dioxide from the gas stream. This not only provides carbon dioxide nutrients to the algae in the algae source, but also reduces the carbon dioxide emissions of the power plant. Preferably, the level of carbon dioxide is reduced by at least about 1%, more preferably by at least about 15%, and even more preferably by at least about 25%. A diagram of this system is depicted in FIG. 7. In addition or in lieu of the above process, the gas stream comprising carbon dioxide can be contacted with an intermediate solvent to purify the gas stream instead of sending the gas stream (which includes impurities in addition to carbon dioxide) directly to the algae suspension or source from the power plant stack. More specifically, the solvent is contacted with the gas stream, preferably at a low temperature, and thereby absorbs the carbon dioxide from the gas stream. The solvent can then be regenerated, preferably by heating, to release the absorbed carbon dioxide. The resulting purified carbon dioxide stream can then be fed to the algae suspension or source as a nutrient. Suitable solvents for use in this process are selected from the group consisting of amines (e.g., monoethanol amine (MEA), N-methyldiethanolamine (MDEA)), carbonates (e.g., calcium carbonate), and mixtures thereof.

Similarly, the algae and filtration media admixture can be pulverized and slurried for feed to a gasification process that operates with a slurry feed (like the GE Quench gasification technology). Likewise, the algae and filtration media admixture can be pulverized and dried for feed to a gasification process that operates with a dry fuel feed (like the Shell SGP gasification process). In these aspects, the filtration media is preferably coal, petroleum coke, biomass, or other material suitable for gasification. The admixture is partially burned (partial combustion) to produce heat as well as synthesis gas (e.g., carbon monoxide and hydrogen), which can be further processed to produce energy and/or chemicals.

Similarly, an algae/coal admixture can be pulverized and slurried to produce Coal Water Slurry for combustion. The use of Coal Water Slurry and Coal Water Fuel has been widely investigated and the use of the algae/coal admixture provides a renewable energy component and increased fuel value for a given coal percentage.

As mentioned herein, the methods are also suitable for extraction of oil from algae. The algae oil can either be extracted by heating the algae and filtration media admixture and collecting the oil from the resulting vapor produced, or by extraction of the oil from the captured algae with solvent. The application of a vacuum can be employed to reduce the boiling point of the algae oil in this process. Vacuum pressure is also useful in rupturing the algae cell walls, as described herein, thereby making the oil more easily extracted or vaporized. Vacuum rupture will also release oil that can be collected by skimming or draining off the admixture slurry.

Figure 8:
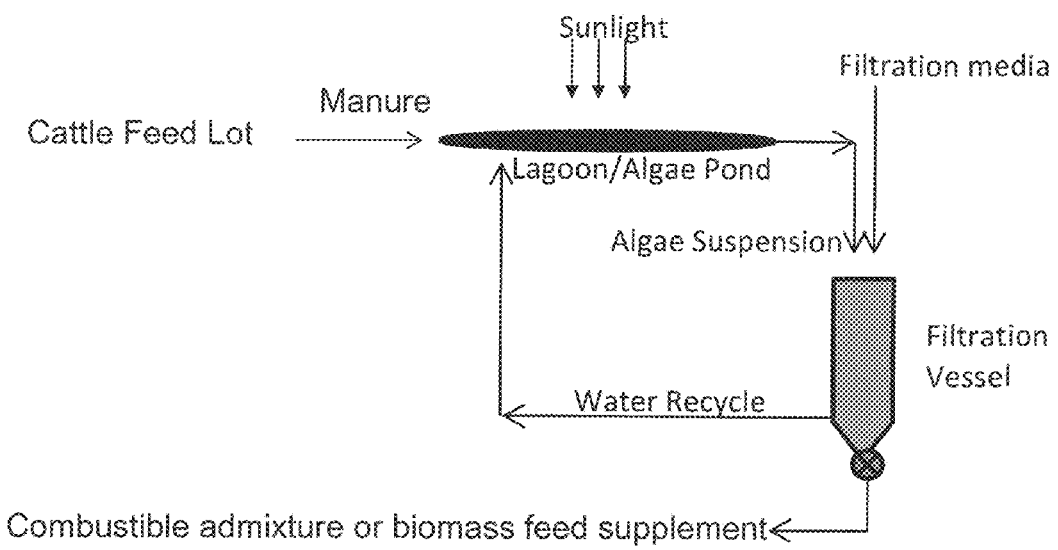
FIG. 8 is a diagram of a process according to a further embodiment of the invention involving use of an algae source associated with a cattle feed lot.

The invention is also suitable for use in water treatment, and specifically the harvesting of algae from wastewater. Advantageously, wastewater often contains a high level of nutrients beneficial to algae growth. In this aspect, the algae consume the nutrients in the wastewater, and the filtration media captures the algae and any residual particulate material in the wastewater during filtration. The resulting filtrate water is improved by the reduction of these nutrients, and removal of particulates. The resulting algae and filtration media admixtures can be sent on for combustion or further processing, as described herein. Suitable wastewaters include municipal wastewater and CAFO wastewater (FIG. 8), among others.

The invention can also be used for general algae control in waterways, lakes, ponds and water processing facilities. The filtering substance can be chosen depending upon the desired end use. A combustible material, such as coal, will allow the captured algae biomass and filtration media admixture to be combusted for heat or power generation, as described herein.

EXAMPLES

The following examples set forth methods in accordance with the invention. It is to be understood, however, that these examples are provided by way of illustration and nothing therein should be taken as a limitation upon the overall scope of the invention.

Example 1

Figure 9:
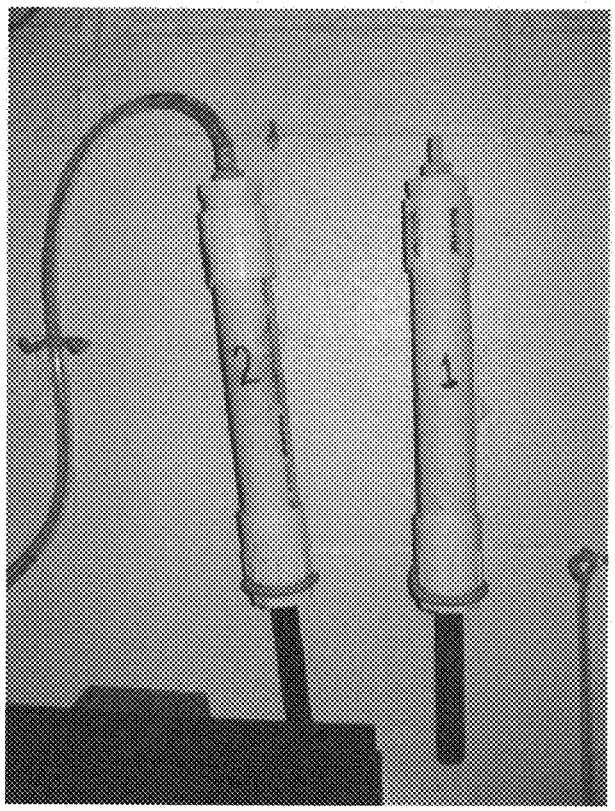
FIG. 9 is a photograph of the two vessel set up utilized in Example 1.

In this Example, two filtration vessels were prepared for filtering algae using 1.5-inch Sch. 40 PVC cut into 12-inch lengths. The bottom of each vessel was fitted with reducing fittings having a 0.5-inch outlet. Next, two layers of a black mesh fabric (mesh size~16 mm) were placed in the bottom of each vessel to retain the filtration media in the vessel, while allowing the filtrate liquid to exit the vessel. The vessel for filter bed #1 was filled with 350 ml of crushed anthracite coal with an average particle size of 0.6-0.8 mm. The vessel for filter bed #2 was filled with the 280 ml of the crushed anthracite layered with a layer of 70 ml of pulverized anthracite in the middle. The pulverized anthracite was produced 70 ml at a time in a 1.25-inch steel pipe with a cap. A 10 lb. metal bar was used to pulverize by striking the material 22 times from a height of 8 inches. Once filled, each vessel was capped with reduced fittings having a ½-inch inlet. The vessels were positioned vertically for the downward flow of algae water through each vessel. A sump pump was used to pump an algae suspension from a tank of algae water to the inlet of each vessel via PVC pipe. The filtrate for each vessel was collected for observation. A photograph of the two-vessel set up is shown in FIG. 9.

For the tests, *Botryococcus braunii* was grown in a photo-bioreactor comprising a 45-gallon aquarium filled with water. Conventional plant food (Schultz's) was added to the water periodically and light was applied to three sides of the aquarium at a schedule of 16 hours on and 8 hours off per 24 hour cycle. The concentration of the algae in the water at the time of testing was estimated at 0.1 wt. %.

Figure 10:
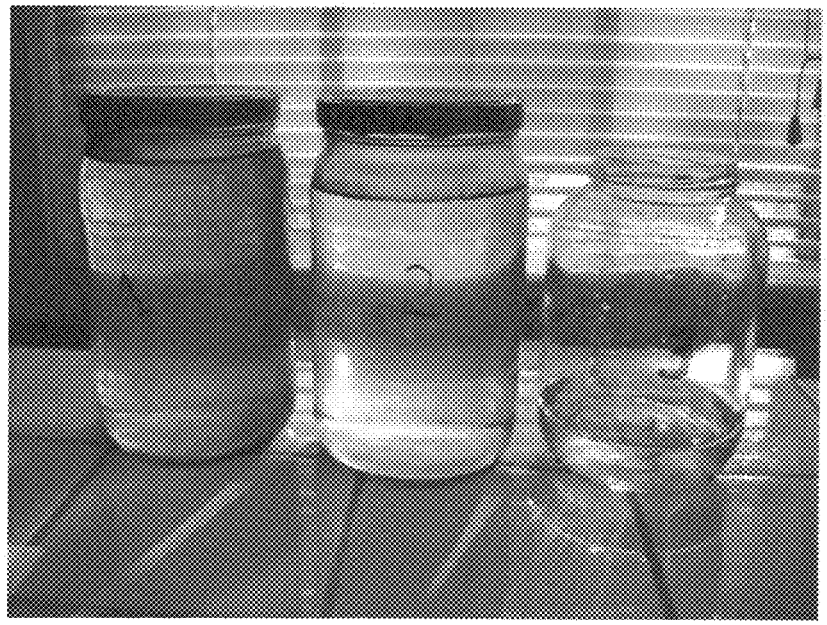
FIG. 10 is a photograph of the unfiltered algae suspension and resulting filtrates from Example 1.
Figure 11:
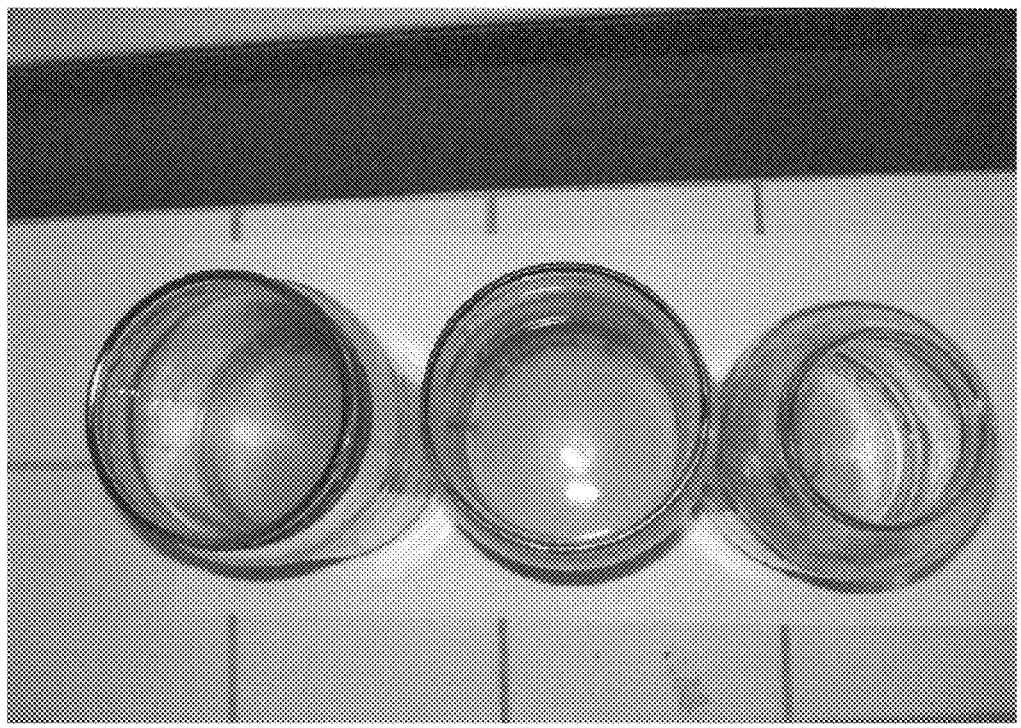
FIG. 11 is a top-down photograph of the unfiltered algae suspension and resulting filtrates from Example 1.

The algae water was first filtered through filter bed #1 at a flow rate of approximately 0.5-1 gpm (2,000-3,800 ml/min.). The pressure drop across the bed was 9 psi. The filtrate was collected for observation. The optical density of the filtrate was visually observed to be the same as the algae suspension feed. Thus, there was no observable capture of algae. The process was repeating using filter bed #2 at a flow rate of about 20 ml/min. (0.005 gpm) for 30 minutes. The pressure drop across the bed was 9 psi. The filtrate from filter bed #2 was collected and observed to be clear with no visible signs of algae, indicating near 100% capture of the algae in the filtration media. FIG. 10 shows a photograph of unfiltered algae water (left), filtrate #1 (middle), and filtrate #2 (right). FIG. 11 is top-down photograph of the unfiltered algae water (left), filtrate #1 (middle), and filtrate #2 (right).

Example 2

In this Example, another filtration bed was prepared using a filtration vessel prepared as described above for Example 1. The vessel was filled with filtration media comprising pulverized anthracite coal and crushed anthracite coal (0.6-0.8 mm average particle size). The filtration bed structure was as follows:

Bottom layer: 70 ml of 0.6-0.8 mm crushed anthracite coal
Second layer: 35 ml of pulverized and screened (18 mesh) anthracite coal
Third layer: 70 ml of 0.6-0.8 min crushed anthracite coal
Fourth layer: 35 ml of lightly pulverized and screened (18 mesh) anthracite coal
Top layer: 105 ml of 0.6-0.8 mm crushed anthracite coal

Figure 12:
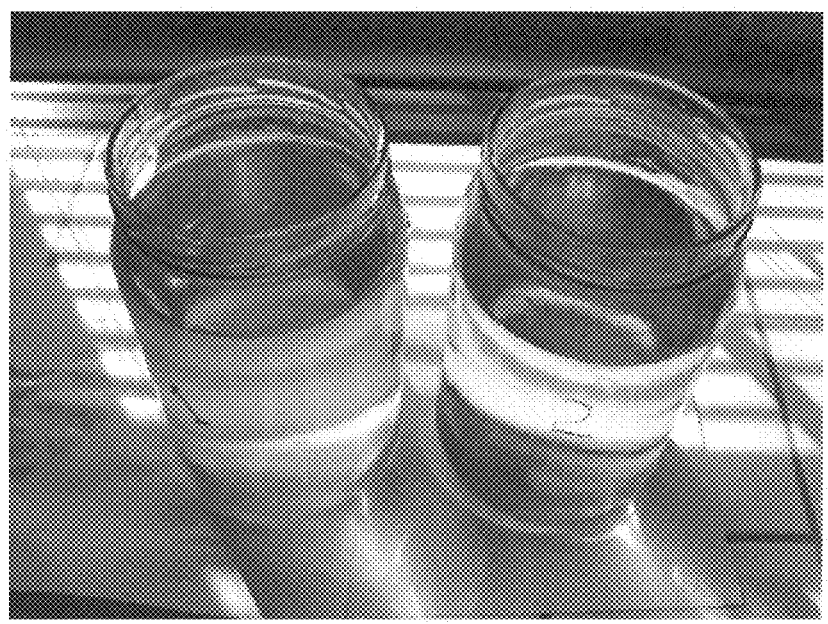
FIG. 12 is a photograph of the unfiltered algae suspension and resulting filtrate from Example 2.

*Botryococcus braunii* algae water was pumped through the filtration vessel as described above, and the filtrate was collected. A higher flow rate of approximately 240 ml/min. (0.06 gpm) was observed. It was also observed that the algae water siphoned passively through the filter bed with a head of about 4 feet. As shown in the photograph in FIG. 12, the filtrate (right) was observed to be clear with no visible signs of algae, as compared to the unfiltered algae suspension (left).

Example 3

In this Example, additional filtration beds were prepared using a filtration vessel prepared as described above for Example 1. For the first test run, anthracite coal was pulverized, and screened with 84 mesh screen. Next, the filtration vessel was filled with a layer of 140 ml of 0.6-0.8 mm crushed anthracite coal, followed by a layer of 70 ml of the pulverized and screened anthracite, and a final layer of 140 ml of the crushed anthracite coal. *Botryococcus braunii* algae water was pumped through the vessel as described above. The pressure of the pump was 9 psig, and no flow was observed through the bed.

For the second test run, a second filtration bed was prepared. The structure of bed was as follows:

Bottom layer: 50-70 ml of 0.6-0.8 mm crushed anthracite
Second layer: 5 ml of pulverized and screened (84 mesh) anthracite
Third layer: 50-70 ml of 0.6-0.8 mm crushed anthracite
Fourth layer: 5 ml of pulverized and screened (84 mesh) anthracite
Fifth layer: 50-70 ml of 0.6-0.8 mm crushed anthracite
Sixth layer: 5 ml of pulverized and screened (84 mesh) anthracite
Seventh layer: 50-70 ml of 0.6-0.8 mm crushed anthracite
Eighth layer: 5 ml of pulverized and screened (84 mesh) anthracite

*Botryococcus braunii* algae water was pumped through the vessel as described above. The pressure of the pump was 9 prig, and low flow was observed through the bed with very high capture of algae. The filtrate was observed to be clear with no visible signs of algae.

For the third test run, a further filtration bed was prepared by filling the filtration vessel with filtration media comprising approximately 70 ml crushed anthracite coal in the bottom (0.6-0.8 mm average particle size), followed by a layer of 210 ml of pulverized anthracite, and a final layer of 70 ml of the crushed anthracite on top. The pulverized anthracite was prepared, as described above in Example 1, except that the material was struck only 12 times from a height of 8 inches. *Botrvococcus braunii* algae water was pumped through the vessel as described above, except that the filtrate water was re-circulated back to the algae water tank. The initial flow rate was observed to be 240 ml/min. (0.06 gpm), which continued for 2 hours when the flow rate was observed to drop to 120 ml/min. (0.03 gpm). At that point, small amounts of algae were observed to begin breaking through in the filtrate. This filtering process was run continuously for four days. The flow rate at the end of the test was 60 ml/min. (0.015 gpm) and algae capture was still occurring. The vessel was emptied and the resulting algae/coal admixture was analyzed. It was calculated and observed that the percentage of algae in the resulting algae/coal admixture was at least 10% of the admixture on a dry weight basis.

Example 4

Figure 13:
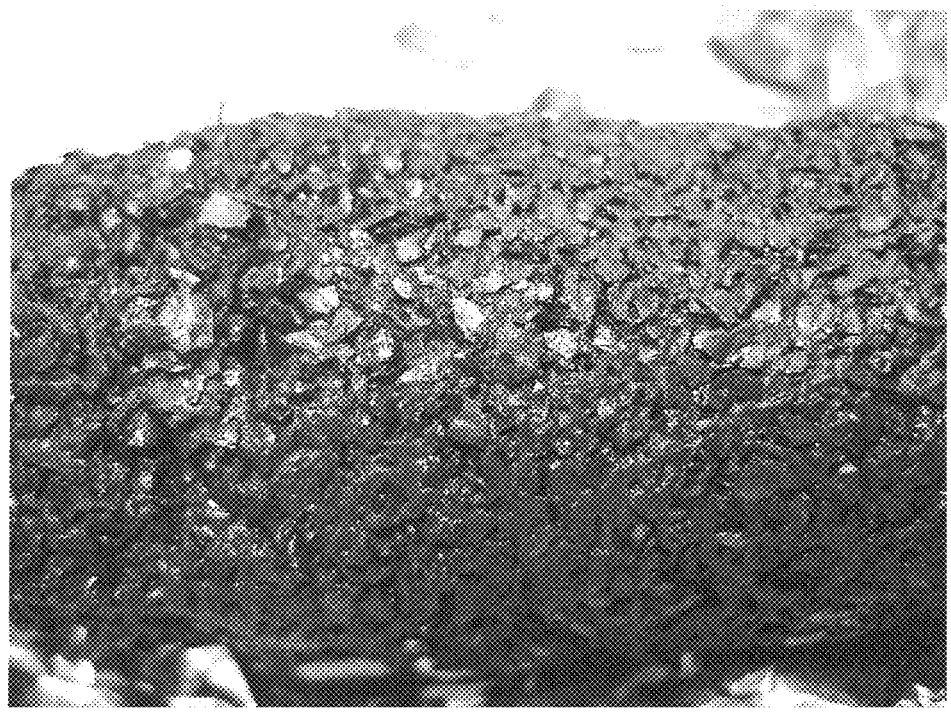
FIG. 13 is a photograph of the algae and filtration media admixture collected in Example 4.

In this Example, a filtration bed was prepared using a vessel according to Example 1. The bed contained 70 ml of crushed anthracite coal (average particle size 0.6-0.8 mm) in the bottom, followed by a layer of 70 ml of pulverized anthracite (produced as described in Example 3, third run), a second layer of 70 ml of the crushed anthracite coal, a second layer of 70 ml of the pulverized anthracite, and a final layer of 70 ml of the crushed anthracite coal on top. Algae water was circulated through the filtration vessel for three days, with the flow rate starting out at 240 ml/min. and dropping off to 60 ml/min. at the end of the run. The filtration vessel was emptied and the algae/coal admixture was analyzed. FIG. 13 is a photograph of the vessel contents. The percentage of algae in the resulting algae/coal admixture was calculated to be greater than 10% on a dry weight basis. The sample was dried outdoors in the sun, and the weight loss results are as follows:

| Time after end of run (hours) | Weight of admixture (g) |
| --- | --- |
| 0 | 232 |
| 8 | 229 |
| 11 | 215 |
| 18.25 | 184 |

At 18+ hours the sample was observed to be completely dry. The sample was then pulverized with a mortar and pestle, and produced a fine greenish black powder of a face-powder consistency (e.g., talcum powder consistency). This powder was easily blown away with air, and it is proposed that this material would be suitable as feed to a pulverized coal power plant based on these results.

Example 5

A series of tests were conducted using outdoor, 80-gallon algae growth vessels and various filtration bed set ups. Several runs were made using different types of coal and different algae strains. Coals tested: Anthracite; Powder River Basin ("PRB;" sub-bituminous); and Illinois (bituminous). Algae tested: *Chlorella* and *Scenedesmus*. Filtration vessels were prepared as described above in Example 1. The use of an Optical Density (OD) Measurement tool allowed the algae concentration in the algae feed and filtrate to be determined.

A first filtration bed was prepared by filling the vessel with 350 ml of PRB coal that had been pulverized and screened through an 84-mesh screen. The OD of the *Chlorella* algae water to be filtered indicated an initial algae concentration of 0.06 wt %. The flow rate observed was approximately 4 ml/min. with a pressure drop of 9 psi across the bed. After filtration the filtrate was analyzed. The algae capture was nearly 100% with negligible traces of algae in the filtrate water.

A second filtration bed was prepared by filling the vessel with 350 ml of screened (18 mesh) Illinois coal (without pulverization due to the high degree of fine material). *Chlorella* algae water was filtered through the vessel. The flow rate observed was 5 ml/min. and the capture of algae was observed to be near 100% with no visible traces of algae in the filtrate. The flow dropped off after about 30 minutes, and the test was stopped.

A third filtration bed was prepared by filling the vessel with 200 ml of crushed anthracite coal (0.6-0.8 mm average particle size) for the bottom layer, followed by a layer of 140 ml of pulverized coal (as prepared above with 12-15 strikes, but no screening), and a top layer of 35 ml of the crushed anthracite coal. The *Chlorella* algae water to be filtered had an OD of 0.88 (algae concentration of 1.2 g/L). A flow rate of 40 ml/min. was observed. The filtrate was collected and analyzed. The OD of the filtrate was 0.121 (algae concentration of 0.067 g/L). The harvesting efficiency was calculated to be 94% removal of algae.

A fourth filtration bed was prepared by filling the vessel with 70 ml of crushed anthracite coal (0.6-0.8 mm average particle size) as the bottom layer, 210 ml of pulverized coal (as prepared above with 12-15 strikes and no screening) as the middle layer, and 70 ml crushed anthracite coal (0.6-0.8 mm average particle size) as the top layer. The initial algae suspension contained a mostly *Scenedesmus* mix of algae with an optical density (OD) of 0.80, which correlates to an algae concentration of 1.07 g/L. The suspension was pumped through the vessel and a flow rate of 5 ml/min. was observed. The pressure drop across the bed was 9 psi. The filtrate was collected and observed. The OD of the filtrate was 0.09, which corresponded to a concentration of 0.02 g/L. The filtrate appeared clear with little visible traces of algae. The harvesting efficiency was calculated to be 98% removal of algae.

Example 6

Additional Testing

In this Example, additional filtration beds were tested. *Botryococcus braunii* algae water was used for all tests. Crushed and/or pulverized anthracite coal was used. The bed structure of the first filtration bed was as follows:

Bottom layer: 35 ml of 0.6-0.8 mm crushed anthracite coal

Second layer: 70 ml of pulverized anthracite coal (22 strikes until puffs of coal dust seen from top of pipe)

Third layer: 70 ml of pulverized anthracite coal (26 strikes until puffs of coal dust seen from top of pipe)

Fourth layer: 70 ml of pulverized anthracite coal (20 strikes until puffs of coal dust seen from top of pipe)

Fifth layer: 70 ml of pulverized anthracite coal (17 strikes until puffs of coal dust seen from top of pipe)

Top layer: 35 ml of 0.6-0.8 mm crushed anthracite coal

The algae suspension was pumped through the vessel and a low flow was observed. The test was stopped soon after starting.

The bed structure of the second filtration bed was as follows:

Bottom layer: 210 ml of 0.6-0.8 mm crushed anthracite coal

Second layer: 140 ml of pulverized anthracite (15 strikes until puffs of coal dust seen from top of pipe)

Top layer: 35 ml of 0.6-0.8 mm crushed anthracite coal

The algae suspension was pumped through the vessel and an initial flow rate of 0.11 gpm (420 ml/min.) was observed. The initial filtrate was observed to be clear with no visible signs of algae, indicating a near 100% removal of algae from the feed. 80 minutes after the flow was started, the flow was observed to drop to 0.05 gpm (200 ml/min.) and algae was observed to be breaking through the filter bed, so the run was stopped.

I claim:

1. A method of using algae as a biofuel comprising:
   (a) providing an admixture comprising algae and a filtration media; and
   (b) burning said admixture to generate heat.

2. The method of claim 1, wherein said providing (a) comprises:
   providing an algae suspension comprising algae dispersed in a liquid medium; and
   contacting said algae suspension with a filtration media, wherein said algae is collected by said filtration media to yield said algae and filtration media admixture.

3. The method of claim 2, wherein said contacting comprises passing said algae suspension through a filtration bed comprising said filtration media.

4. The method of claim 3, wherein said filtration media comprises a granular, particulate, or fibrous filtering substance, said algae being collected on said filtration media and in the interstitial spaces or voids between said filtration media granules, particles, or fibers.

5. The method of claim 3, wherein said filtration bed is contained within a vessel having an inlet and an outlet, said algae suspension being pumped into said inlet at a flow rate of from about 0.5 gpm to about 100,000 gpm.

6. The method of claim 3, wherein said filtration bed is contained within a vessel open to the atmosphere, and wherein said contacting comprises applying said algae suspension to said filtration bed.

7. The method of claim 6, wherein said filtration media is coal and said vessel is a coal rail car.

8. The method of claim 7, wherein said algae suspension traps or binds coal fines and particles for the prevention of coal losses in rail car transit.

9. The method of claim 2, wherein said contacting yields a filtrate comprising said liquid medium, said algae suspension having an initial concentration of algae wherein said filtrate comprises an algae concentration that is at least about 70% less than said initial algae concentration.

10. The method of claim 2, wherein said filtration media is coal and said burning (b) comprises feeding said admixture to a combustion chamber, said burning (b) yielding a gas stream comprising carbon dioxide by-products, further comprising supplying said gas stream to said algae suspension for the removal of at least a portion of said carbon dioxide therefrom.

11. The method of claim 2, wherein said filtration media is coal and said burning (b) comprises feeding said admixture to a combustion chamber, said burning (b) yielding a gas stream comprising carbon dioxide by-products, further comprising:
  contacting said gas stream with a solvent for removal of carbon dioxide from said gas stream;
  regenerating said solvent to yield a purified carbon dioxide gas stream; and
  contacting said purified carbon dioxide gas stream with said algae suspension for the removal of at least a portion of said carbon dioxide therefrom and consumption of at least a portion of said carbon dioxide by said algae.

12. The method of claim 2, wherein said filtration media is paper or paper pulp, wherein the resulting admixture is used as fuel, dried and used as fuel, pelletized or briquetted for use as fuel, treated for recovery of algae oil, or further processed for use as paper.

13. The method of claim 2, wherein said providing of an algae suspension comprises collecting said algae suspension from a source of algae selected from the group consisting of naturally-occurring algae-laden water streams, natural or man-made ponds and lakes, polluted water streams, cattle feed lot ponds, concentrated animal feed operation ponds, algae culture vessels, algae open ponds, algae closed ponds, algae raceway ponds, settling basins, water troughs, water holding tanks, wastewater, seawater, photobioreactors, anaerobic digester effluent, freshwater, salt water, brackish water, brine, and combinations thereof.

14. The method of claim 1, wherein said filtration media is selected from the group consisting of carbonaceous solids, fibrous plant materials, torrified biomass, fibrous animal waste, fibrous industrial waste products, fibrous recyclable waste products, paper products, and combinations thereof.

15. The method of claim 14, wherein said filtration media is coal.

16. The method of claim 15, wherein said burning (b) comprises feeding said admixture to a combustion chamber, said heat being converted into electricity.

17. The method of claim 14, wherein said burning (b) comprises feeding said admixture to a combustion chamber for partial combustion and production of synthesis gas.

18. The method of claim 1, further comprising drying said admixture prior to said burning (b).

19. The method of claim 1, wherein said filtration media is a non-combustible, inert carrier selected from the group consisting of rocks, sand, gravel, minerals, ceramic, dirt, clay, metal, metal mesh or screens, sintered metal, pebbles, fly ash, aluminosilicates, glass, porous glasses, lime, limestone, ash, activated alumina, silica, zeolites, and mixtures thereof.

20. The method of claim 19, wherein said burning (b) comprises feeding said admixture to a combustion chamber, said filtration media being collected or removed from said combustion chamber after said burning (b) and re-used.

21. The method of claim 1, wherein said admixture comprises from about 0.5% by weight algae to about 90% by weight algae, based upon the dried algae weight as a % of the total weight of the dried algae and filtration media admixture taken as 100% by weight.

22. The method of claim 1, wherein said burning (b) also yields synthesis gas.

23. The method of claim 1, wherein said admixture is processed into Coal Water Slurry.

* * * * *